US012453675B2

(12) United States Patent
Carrington et al.

(10) Patent No.: US 12,453,675 B2
(45) Date of Patent: Oct. 28, 2025

(54) CRYSTAL, SPIRITUAL, ENERGY HEALING METHOD AND FLOAT VESSEL

(71) Applicants: Ann Carrington, Kewarra Beach (AU); Brent Smith, Kewarra Beach (AU)

(72) Inventors: Ann Carrington, Kewarra Beach (AU); Brent Smith, Kewarra Beach (AU)

( * ) Notice: Subject to any disclaimer, the term of this patent is extended or adjusted under 35 U.S.C. 154(b) by 735 days.

(21) Appl. No.: 17/861,109

(22) Filed: Jul. 8, 2022

(65) Prior Publication Data

US 2022/0339065 A1 Oct. 27, 2022

Related U.S. Application Data

(63) Continuation-in-part of application No. PCT/AU2021/000002, filed on Jan. 11, 2021.

(51) Int. Cl.
*A61H 99/00* (2006.01)
*B63B 22/24* (2006.01)

(52) U.S. Cl.
CPC ............. *A61H 99/00* (2013.01); *B63B 22/24* (2013.01); *A61H 2201/0115* (2013.01); *A61H 2201/10* (2013.01)

(58) Field of Classification Search
CPC ........ A61H 2201/0115; A61H 2201/10; A61H 99/00; A47G 2200/02; B63B 22/24; B65D 88/78
USPC ................ 220/560; 441/133–135, 129, 2, 32
See application file for complete search history.

(56) References Cited

U.S. PATENT DOCUMENTS

| | | | | |
|---|---|---|---|---|
| 3,747,552 A * | 7/1973 | Rhodes | B63B 21/26 114/295 |
| 4,588,618 A * | 5/1986 | Wolfe | A41G 1/00 428/7 |
| 7,553,041 B1 * | 6/2009 | Terhune | F21V 35/00 362/101 |
| 2006/0017286 A1 * | 1/2006 | Kosmyna | B05B 7/2408 285/305 |
| 2014/0138293 A1 | 5/2014 | Tackett et al. | |
| 2016/0120347 A1 | 5/2016 | Ballard et al. | |
| 2017/0112313 A1 * | 4/2017 | Reichle | A47G 23/0241 |

FOREIGN PATENT DOCUMENTS

| | | | |
|---|---|---|---|
| CN | 204931347 U | 6/2016 |
| DE | 202009011220 U1 | 12/2009 |

* cited by examiner

*Primary Examiner* — Rafael A Ortiz
(74) *Attorney, Agent, or Firm* — Craft Chu PLLC; Andrew W. Chu

(57) ABSTRACT

A float vessel includes a buoyant body with a decorative top portion and a bottom portion with a plurality of connectors for material attachments. The bottom portion includes the plurality of connectors disposed in a spaced manner along the lower surface. Each connector provides a removable connection which allows a user to choose and customize the type of material attachments connected to the body and specific arrangement on the lower surface. Each material attachment can include a male threaded mount ring with a material permanently attached thereto. The material as mentioned can be a crystal, a gemstone a mineral, or other natural material which is permanently attached to the mount ring. The invention includes the method of harnessing the magnified healing energies of crystals, gemstones or minerals with the floating vessel.

14 Claims, 6 Drawing Sheets

CRYSTAL, SPIRITUAL, ENERGY HEALING METHOD AND FLOAT VESSEL

CROSS-REFERENCE TO RELATED APPLICATIONS

The present application claims priority under 35 U.S.C. Section 120 from U.S. Patent Application Serial No. PCT/AU21/00002, filed on 11 Jan. 2021, entitled "FLOAT VESSEL FOR MATERIALS". See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM EFS-WEB

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to an innovative method of crystal healing that uses a floating vessel to suspend healing crystals, stones and other materials to be partly or fully submerged in a body of liquid. The inventive method and apparatus are primarily intended for energy, spiritual and Reiki healing with crystals, gemstones and other minerals and natural material to be partly or fully submerged in water in a bath, but is not limited to this use, and can also be used for other applications such as drinking water containers and decorative receptacles with liquids, as well as larger bodies of water or other liquid.

2. Description of Related Art Including Information Disclosed Under 37 CFR 1.97 and 37 CFR 1.98

It is known that different crystals, gemstones and other natural minerals (hereinafter referred to as "materials") provide relaxation, well-being, energy giving, healing and other properties. It will be desirable to provide a new method for a user to enhance their crystal/energy/spiritual/Reiki healing experience.

The present innovative method and inventive apparatus seeks to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

BRIEF SUMMARY OF THE INVENTION

The invention provides a method of harnessing the magnified healing energies of crystals, gemstones or minerals when using crystal, gemstone or mineral materials in liquid, the method comprising:

providing a float vessel comprising a buoyant body having a top portion and a bottom portion, the bottom portion having a plurality of vessel connection means for connecting crystal, gemstone or mineral materials attachments thereto, providing a plurality of crystal, gemstone or mineral material attachments having complementary attachment connection means to the vessel connection means, connecting a plurality of crystal, gemstone or mineral material attachments to the float vessel via the complementary connection means, wherein in use the buoyant body floats in a body of liquid, where the top portion is above the liquid top surface, and the bottom portion is submerged in the liquid below the liquid top surface such that the crystal, gemstone or mineral material attachments are partially or fully submerged in the liquid that allows the crystal, gemstone or mineral material attachments to float and move across the body of liquid.

Preferably, the crystal, gemstone or mineral material attachments are interchangeable via the complementary connection means allowing the user to change the crystal, gemstone or mineral material attachments to suit their healing requirements.

The invention also provides a float vessel comprising a buoyant body having a top portion and a bottom portion, the bottom portion having a plurality of vessel connection means for connecting crystal, gemstone or mineral material attachments thereto, a plurality of crystal, gemstone or mineral material attachments having complementary attachment connection means to the vessel connection means, the plurality of crystal, gemstone or mineral material attachments being attachable to the float vessel via the complementary connection means, wherein in use the buoyant body can float in a body of liquid, where the top portion is above the liquid top surface, and the bottom portion is submerged in the liquid below the liquid top surface such that the crystal, gemstone or mineral material attachments are partially or fully submerged in the liquid that allows the crystal, gemstone or mineral materials to float and move across the body of liquid.

Preferably, the bottom portion is larger, denser and/or heavier than the top portion such that the float vessel can only float with the bottom portion submerged in the liquid.

Preferably, each vessel connection means comprises a threaded female socket in the bottom portion and each complementary attachment connection means comprises a corresponding male threaded mount ring of a material attachment.

Alternatively, each vessel connection means comprises a bayonet socket and each complementary attachment connection means comprises a bayonet mount formation.

Alternatively, the vessel connection means comprises locking means for locking the material directly thereto, and the complementary attachment connection means comprises a shaped end of the material attachment.

Preferably, the locking means comprises a claw mechanism or a grip mechanism having teeth, claws, or high friction surfaces which are biased to engage a shaped end portion of a material attachment therein.

Preferably, vessel connection means are provided to the side walls of the bottom portion and to the top portion.

Preferably, the vessel further comprises an anchoring mechanism to stop or limit movement of the float vessel within the body of liquid.

In another embodiment, the body comprises a central cavity extending from a top surface to a lower surface thereof for receiving a hollow light transmitting candle holder, the float vessel further comprising the candle holder being of a height such that a bottom wall thereof will be disposed below the bottom surface of the body, wherein in use, a candle received in the candle holder will be below the surface of the liquid and will provide an illuminating effect to the body of liquid and the crystal, gemstone or mineral material attachments.

Preferably, a reflective substance is attached to the lower surface of the vessel to enhance the light reflection of the candle.

In another embodiment, the top portion is a half sphere and the bottom portion is a half sphere such that the float vessel comprises a buoyant whole sphere shaped body having a plurality of vessel connection means for connecting material attachments thereto disposed in a spaced manner along its surface, wherein in use, crystal, gemstone or mineral material attachments are attached to the vessel connection means and the buoyant body can float in a body of liquid and can rotate in the body of liquid allowing different crystal, gemstone or mineral material attachments to enter the liquid at different times.

Preferably, the float vessel further comprises a movable biasing weight in the float vessel such that the top portion or the bottom portion can remain submerged, where the user can select as to whether the top portion or the bottom portion will be submerged in the liquid.

In another embodiment, wherein the crystal, gemstone or mineral materials are enclosed in a permeable container having a corresponding attachment connection means.

According to the first aspect, the present innovative method provides a new way to harness the magnified healing energies of crystal/energy/spiritual/Reiki healing when using materials in water, the innovative method allows the materials to be partially or fully submerged in the water in a dynamic way that allows them to float across the body of liquid.

Other aspects of the inventive apparatus are also disclosed.

BRIEF DESCRIPTION OF THE SEVERAL VIEWS OF THE DRAWINGS

Notwithstanding any other forms which may fall within the scope of the present inventive apparatus, preferred embodiments of the present apparatus will now be described, by way of examples only, with reference to the accompanying drawings.

DETAILED DESCRIPTION OF THE INVENTION

Figure 1:
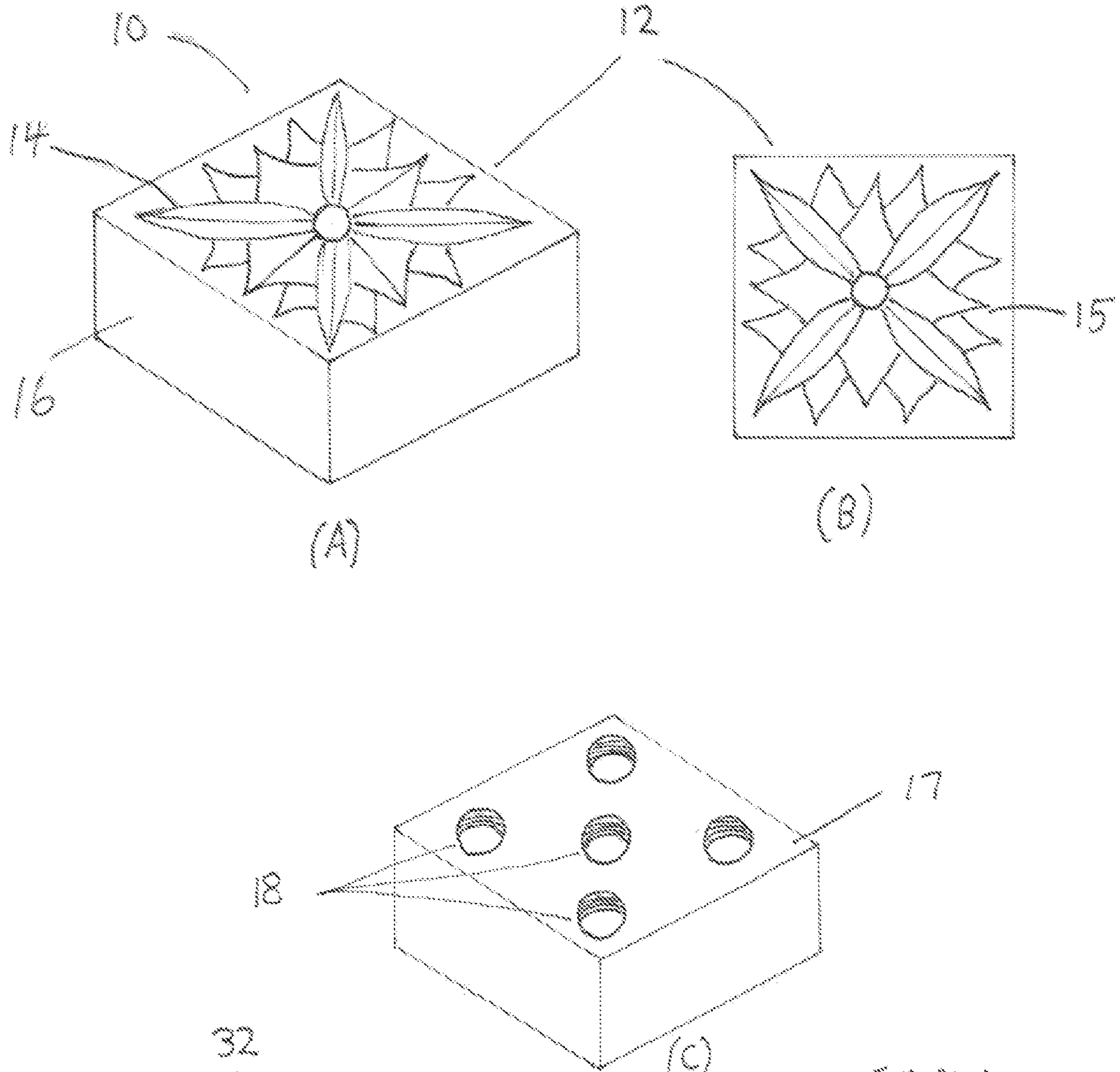
FIG. 1 shows (a) top perspective view, (b) top view, and (c) bottom perspective view of a float vessel according to a preferred embodiment of the present invention.

It should be noted in the following description that like or the same reference numerals in different embodiments denote the same or similar features.

FIG. 1 shows a float vessel 10 according to a preferred embodiment of the present inventive apparatus. The float vessel 10 comprises a buoyant body 12 which has a decorative top portion 14 and a bottom portion 16 with a plurality of connection means 18 for material attachments 20.

The body 12 in the example shown has a flat top surface 15 and a flat lower surface 17. In use, the buoyant body 12 floats in a body of liquid, where the top portion 14 with the top surface 15 are above the liquid top surface, and the bottom portion 16 with the lower surface 17 are submerged in the liquid, being below the liquid top surface, thus allowing the healing energies and properties of the materials to be magnified by the water.

The top portion 14 can be shaped as desired to provide the required decorative effect and/or spiritual healing effect through the use of spiritual symbols and design (e.g. spiritual mandalas or OM symbol). The top portion 14 can include additional decorative features such as a photo frame or a candle holder as described below.

The bottom portion 16 is larger, denser and/or heavier than the top portion 14 to ensure that the bottom portion 16 with the lower surface 17 is always below the liquid top surface, and the top portion 14 is above the liquid top surface. The addition of the material attachments 20 to the body 12 in use also adds to the weight of the bottom portion 16. Alternatively, the body 12 can be shaped such that it can only float in the one orientation as above. The bottom portion 16 for example can be shaped similar to a boat hull.

The bottom portion 16 includes the plurality of connection means 18 disposed in a spaced manner along the lower surface 17. Each connection means 18 in the example comprises a threaded female socket for receiving a corresponding male threaded mount ring 30 of a material attachment 20. The connection means 18 can be embodied in other forms, such as a press-fit socket to receive a corresponding mount formation, a bayonet socket to receive a bayonet mount formation, or other suitable corresponding connection means. The corresponding connection means can also be reversed, in that the bottom portion 16 can have the male formations to be received in female formation mounts of the material attachments 20.

The connection means 18 provides a removable connection which allows a user to choose and customize the type of material attachments 32 connected to the body 12, as well as their specific arrangement on the lower surface 17. Connection means 18 can also be provided to the side walls of the bottom portion 16, as well as the top portion 14. The connection means is advantageous to the innovative crystal/ spiritual/energy/Reiki healing method as it allows for the interchange of different materials to respond to the current healings needs of the user.

Figure 2:
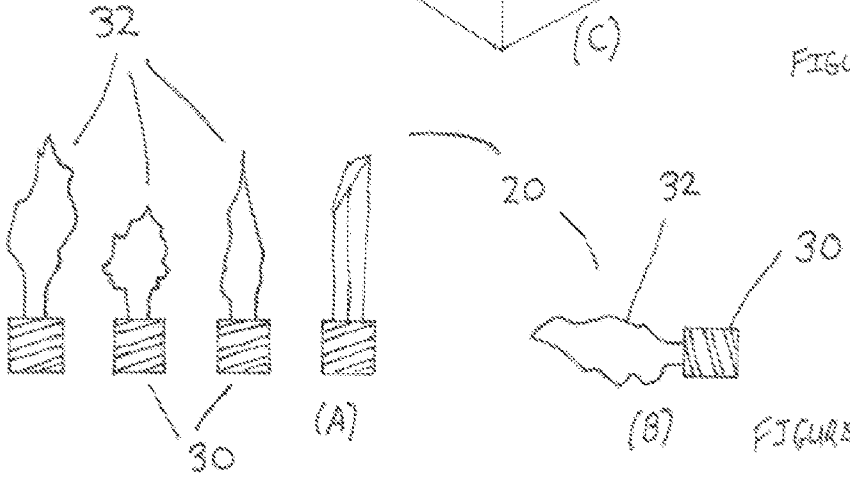
FIG. 2 shows (a) a plurality of different material attachments for the float vessel and (b) is a side view of one of the material attachments.

FIG. 2 shows a plurality of different material attachments 20 for the float vessel. Each material attachment 20 comprises a male threaded mount ring 30 with a material 32 permanently attached thereto. The material 32 as mentioned can be a crystal, a gemstone a mineral, or other natural material which is permanently attached to the mount ring 30.

Figure 3:
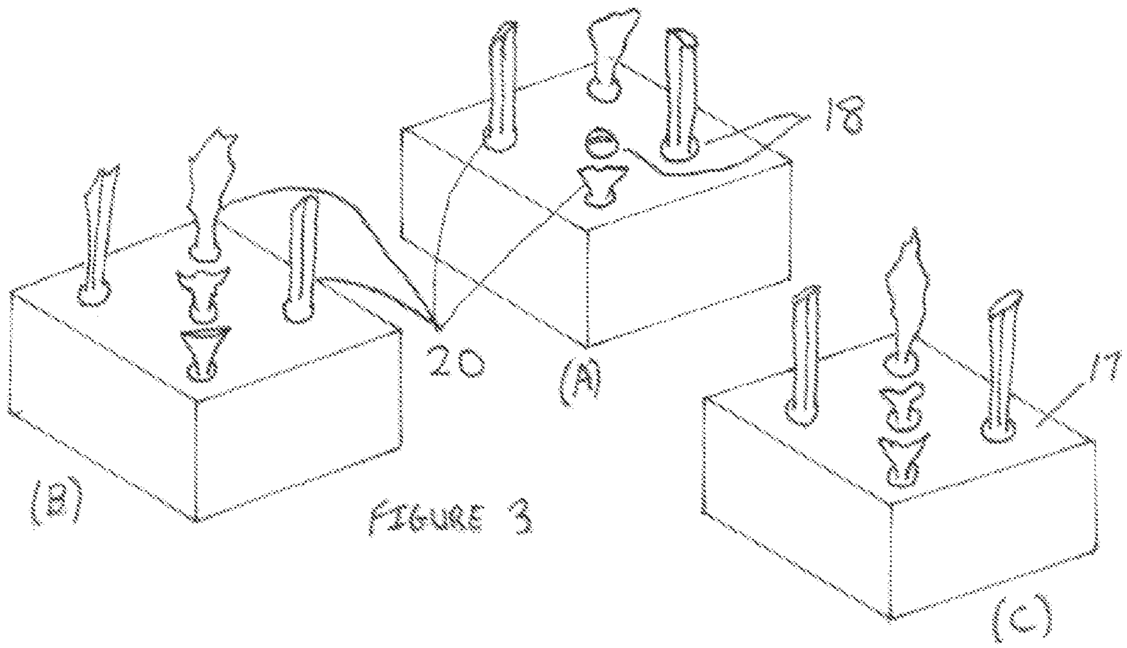
FIG. 3 (*a*) shows mounting of the material attachments to the bottom portion of the float vessel and (b) and (c) shows other arrangements of the material attachments.

FIG. 3 shows mounting of the material attachments 20 to the bottom portion 16 of the body 12. Each material attachment 20 can be screwed on to the body 12, via the threaded mount ring 30 and the threaded socket 18. As shown, the user can choose the number and type of material attachments 20 to be mounted to the body 12, as well as their specific arrangement thereon.

Figure 4:
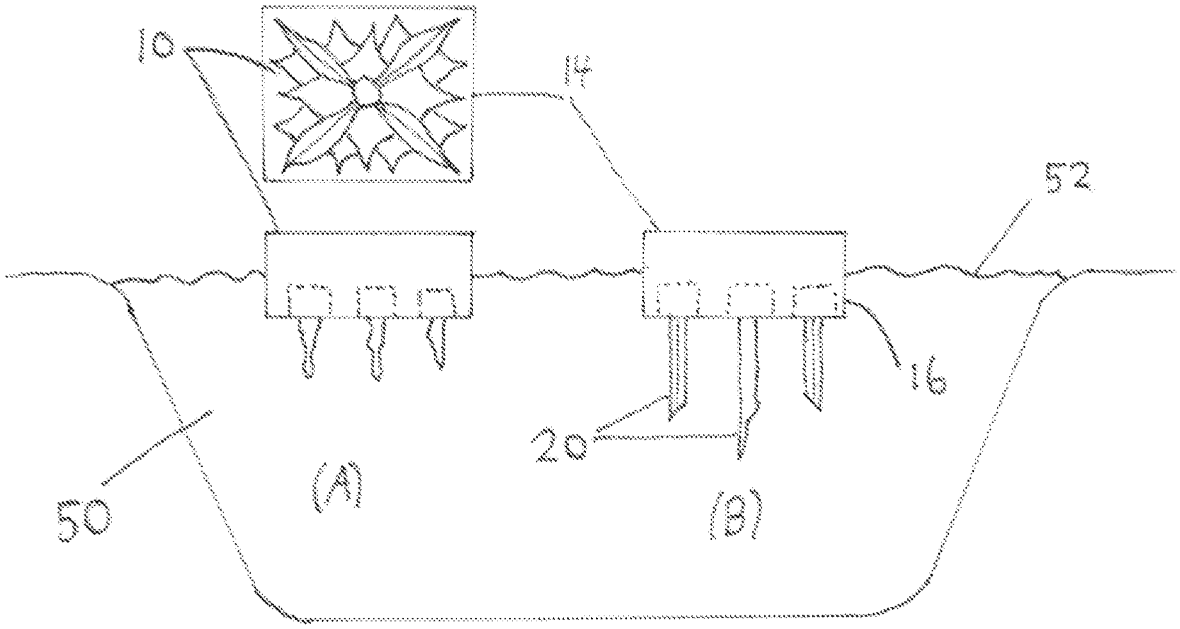
FIG. 4 shows the float vessel with the material attachments in an example use with (a) showing a top perspective view and (b) showing a side perspective view.

FIG. 4 shows the float vessel 10 with the material attachments 20 in an example use. As can be seen, the buoyant body 12 floats along the top surface 52 of a body of water 50, where the top portion 14 with the top surface 15 are above the water top surface 52, and the bottom portion 16 with the lower surface 17 and the material attachments 20 are submerged in the water 50, being below the water top surface 52. The material attachments 20 extend downwardly from the lower surface 17 and are thus effectively suspended from the body 12. This ensures that the materials 32 are always fully submerged in the water 50.

The present inventive apparatus thus provides a float vessel that submerges one or more suspended crystals, gemstones, minerals or other natural material in water for the purpose of transmitting and amplifying the healing properties and energies of said materials to any person partially submerged in the water with the float vessel.

Thus, allowing for the new crystal/spiritual/energy/Reiki healing method whereby the energies of the attached material attachments 20 are magnified and enhanced by the body of water 50. This then allows any person or body part submerged in the water to experience a more powerful healing experience and/or allows for the water enhanced healing energies/properties to be radiated beyond the vessel into the surroundings impacting the environment and those within it. Further, as they are now submerged in the water yet suspended by the float vessel they can move in a dynamic and responsive way in the body of water which is an advantageous element of the innovative healing method.

The vessel is made of buoyant material and is designed to be aesthetically pleasing and spiritually energized, symbolic and/or meaningful with use of a range of designs, colors, shapes, sizes and finishes, and has the material attachments 20 via a connecting means 30 and 18 that allows the material attachments to be interchangeable via corresponding connection means 30 and 18 between the float vessel and the material attachments 20. In another embodiment, some materials may be permanently attached to the float vessel.

Central to the innovative crystal/spiritual/energy/Reiki healing method is the ease of interchange of materials attachments 20 as required by current healing needs of the user. It is anticipated that the material attachments 20 will be regularly connected and disconnected from the bottom portion 16. The connecting system further enhances the flexible and range of healing experiences as the material attachments can be connected to other related apparatus'. The removable connecting system allows for the material attachments to be interchangeable to adapt to the needs of the user at each use. For example, the user may be stressed one day and choose said materials that are known to have healing properties to reduce stress and anxiety, but the next day it may be that the user wishes to increase their capacity for focus and concentration in which case they would change the said materials from the previous use to materials known for their healing properties relating to increased focus and attention.

The components of this innovative crystal/spiritual/energy/Reiki healing method and inventive apparatus will have industrial application as it is envisioned that the innovative crystal/spiritual/energy/Reiki healing method will desirable once people are educated to the new method and its benefits. Once this is achieved the inventive apparatus that allows for the innovative crystal/spiritual/energy/Reiki healing method will be sought after as the innovative crystal/spiritual/energy/Reiki healing method is not possible to the full extent as achieved through the innovative crystal/spiritual/energy/Reiki healing method without the use of all elements of the inventive apparatus. The inventive apparatus which supports the innovative crystal/spiritual/energy/Reiki healing method will be available in a range of combinations to cater for different levels of experience and expertise in crystal/spiritual/energy/Reiki healing.

Although the primary use of the inventive apparatus, float vessel 10 and the material attachments 20 is to support the innovative crystal/spiritual/energy/Reiki healing method within a body of water (namely a bath of some description or in a vessel of water in a room), both the float vessel 10 and the material attachments 20 have additional functions. After use in the body of water, the float vessel 10 with the material attachments 20 can be placed on a stand and become an ornamental and decorative feature that is both aesthetically pleasing and continues to allow the healing properties of the material attachments 20 to permeate the room and be accessible to users within the room where they are kept on display. The inventive apparatus can be placed in a water vessel/container placed on a desk/stand and persons near the vessel/container receive the energy radiating from the vessel/container as magnified by the body of liquid.

Figure 6:
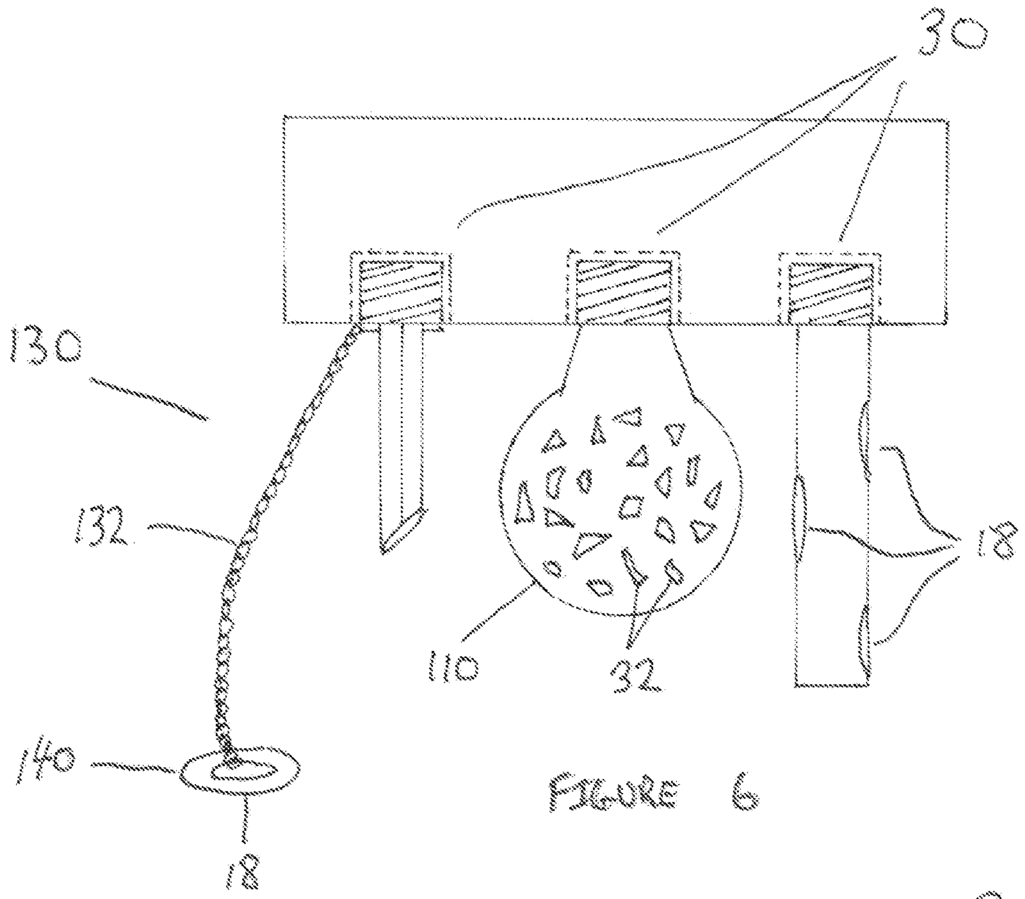
FIG. 6 shows additional features for the float vessel.

FIG. 6 shows additional features for the float vessel 10. It is to be noted the material attachments 20 can be embodied in other forms, such as a liquid permeable container or bag 110 in which the material or materials 32 are housed, with the container or bag 110 having a connection means 30. An expander branch 120 with a male connection means 30 and a plurality of spaced additional female connection means 18 formed therein or branching therefrom can also be provided to expand on the number of material attachments 20 that are connectable to the body 12. Such an expander branch will provide connection means 18 which are spaced from the body 12.

A central benefit of the present inventive apparatus as it relates to the innovative crystal/spiritual/energy/Reiki healing method is that the float vessel 10 can float around the body of water with the user partially submerged in order to expand the reach of the healing energy and properties of the material attachments ensuring they cover areas that most require the healing energies/properties of the material attachments in the moment.

An additional component of the apparatus design to enhance and focus healing energies of the material attachments 20 can include an attachable anchoring mechanism 130. The anchoring mechanism 130 will include a flexible tie means 132 which for example can be a string, chain or cable and an anchor 140 (which can be a weight, suction cup, hook, etc.) which will be able to attach and detach to the float vessel 10, and when attached will stop or limit movement of the float vessel within the body of water. The length of the tie means 132 is preferably adjustable. This allows the float vessel 10 to be restricted in its movement in a specific place as selected by the user. This will allow for focused energy and healing in the selected area. For example, if the materials being used relate to the heart chakra the user may elect to have some (or all) of their time bathing with the vessel to be focused on the heart chakra region and therefore elect to attach the anchor device and place it near the chest to keep the vessel and the said materials within the desired region of the heart chakra. The tie means 132 as shown includes connection means 130 which will allow removable connection to the body 12. Alternatively, the tie means 132 can be fixedly attached to the body 12. This also provides the benefit of avoiding contact with walls of the bath and not scratching or damaging the bath.

The vessel body is made from buoyant material whether manmade or naturally occurring, including but are not limited to wood, foam and plastics. The vessel will be provided in a range of different designs which means they will vary in shape, colours, finishes, sizes, patterns, decorations and the number of connector openings (connection means 18) for the material attachments 20. The vessel body can be provided with a combination of interchangeable mounts for the material attachments 20 and permanently attached materials.

Each float vessel 10 will have 1 or more connector openings for materials to be removably attachable, or 1 or more permanently attached materials to the bottom of the vessel for submersion in the body of water. Preferably, a total of 5, 7 or 9 materials are attachable or permanently attached to each float vessel.

The float vessel 10 may also have connector openings 18 for materials or permanently attached materials on other surfaces of the vessel. For example, some may be used on the top and not be submerged and others may be used on the sides which will still submerge the materials when vessel is in a body of water or at least partly submerge along the water surface.

Figure 5:
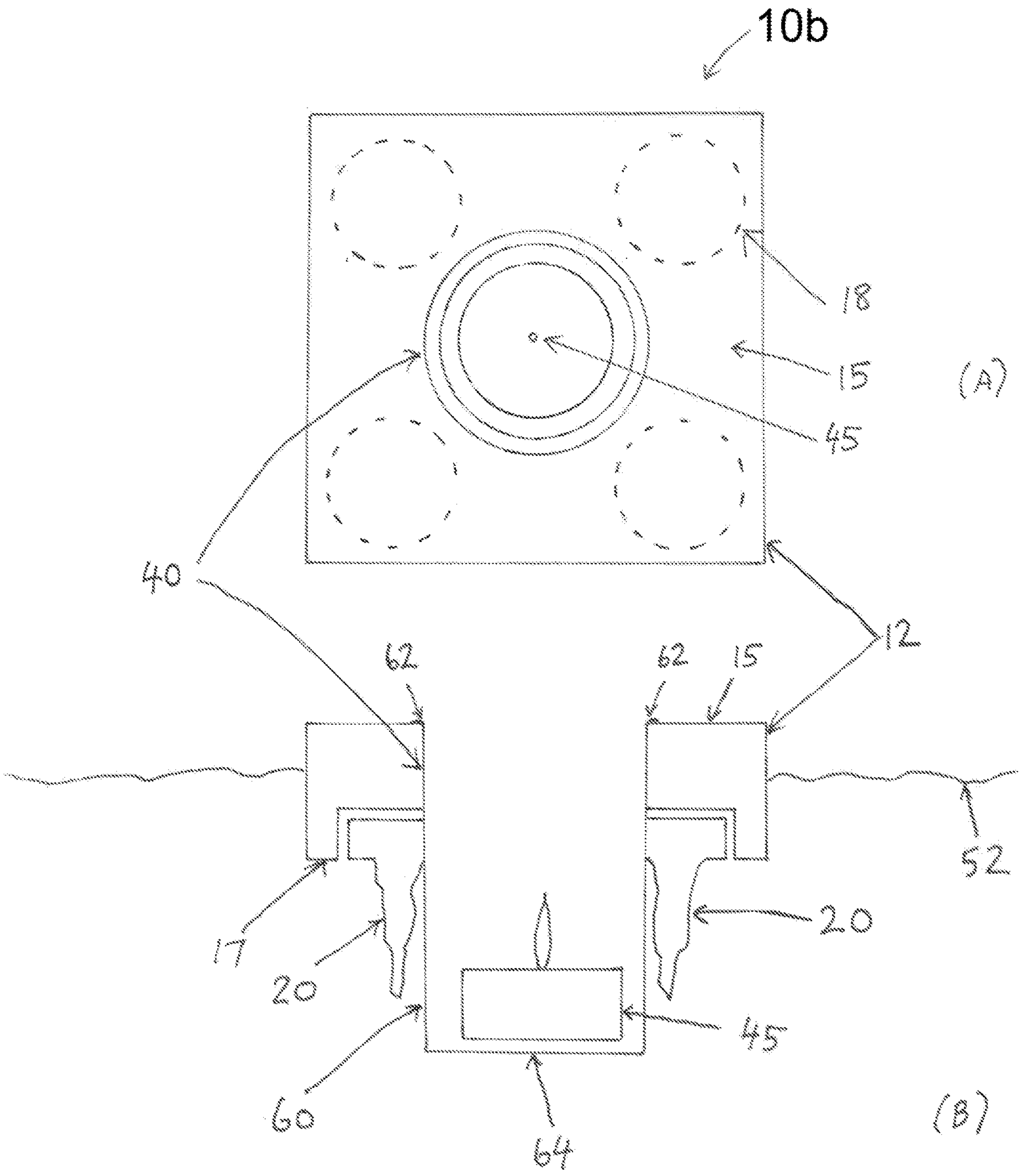
FIG. 5 (*a*) shows a top view and (b) shows a side cross-section view of a vessel according to another embodiment.

FIG. 5 shows a float vessel 10*b* according to another embodiment. In this embodiment, a central cavity 40 is formed in the body 12 which extends downwardly from the top surface 15. The central cavity 40 can extend to a bottom wall short of the lower surface 17, or can extend all the way through the lower surface 17. In the example shown, the central cavity 40 extends all the way through and is shaped to receive a hollow cylindrical glass candle holder 60. The candle holder 60 has a top flange 62 which engages the top surface 15, and is of a height that a bottom wall 64 thereof will be disposed below the material attachments 20 or aligned with the material attachments 20. A (tea light) candle 45 received therein will thus be below the water surface 52 in use and will provide an illuminating effect to the body of water and the material attachments 20. The float vessel can also have a reflective substance attached to the lower surface of the vessel to enhance the candle's light reflection. The unity of invention then between float vessel 10 and float vessel 10*b* is that they are apparatus that allow for the innovative crystal/spiritual/energy/Reiki healing method to be executed.

This embodiment thus provides a vessel that has a candle in a container submerged through the middle of the vessel. This vessel has a hole 40 in the middle in which a container 60 made of glass or other clear material such as plastic or acrylic will be attached to the vessel. The container 60 will extend below the vessel and be submerged in the body of water. The container will be used to hold a candle which will illuminate the bath or body of water and the materials attached to the bottom of the vessel. A reflective substance such as glass, aluminium composite or acrylic, in some instances can be attached to the lower surface 17 of the vessel to enhance the candle's light reflection and the refraction created by the materials in the candle's light.

In another embodiment, the top portion is provided with a shallow recess, this allows for a tealight candle to be placed therewithin to provide additional ambience.

Both candle options (submerged and not submerged) also allow for the inclusion of an aspect of aromatherapy should the user elect to use scented candles.

Materials that are not permanently attached to the vessel are permanently attached to a mounting means to allow the material to be connected and temporarily attached to the connector openings on the float vessel. The materials are permanently attached to the connecting device using a casting method that may include casting materials such as resin or metals. Resin to be used is preferably ecofriendly and nontoxic after curing. While most materials will be directly cast into the mounting means, others due to shape, physical properties, configuration, density, durability etc., may require attachment to an additional material such as a metal dowel or pin being permanently cast into the mounting means. Still other materials may require that they be enclosed in a permeable container made of metals, plastics or fabric before the permeable container is then permanently attached to a connecting device.

The current example uses threaded connectors as the connection means to attach the material attachments 20 to the float vessel 10. However, a range of other connecting systems could be utilized such as; push in and pull out fastening systems, plugs, resistance fasteners, interference fits or interface fits (these connecting systems range in material including, plastic, silicone, rubber and metals). As with the standard system, the corresponding connection means requires a male and a female component, one attached to the float vessel and the other attached to the material.

Materials to be used include crystals, gemstones, minerals, and other materials believed to have healing properties (e.g. shells). Materials will be attached to the vessel either permanently or temporarily via the connecting system discussed above. As discussed above those that are interchangeable or temporary connectors will be permanently attached to a connector mounting means. When not attached to the vessel for use in a body of water or as a decorative feature in the vessel on the stand, the materials can be placed individually in the stand, a container, or a carry case. Materials are selected for their healing properties and will take into account their individual physical properties to ensure they are suitable for this innovative crystal/spiritual/energy/Reiki healing method meaning they must be able to be used in water and are non-toxic when used in water. The size, color, types and combinations of materials will vary depending on the package and specific healing purpose.

The assembly can include a stand. The stand allows for the safe drying and storage of the vessel and the material attachments 20. It also allows the material attachments to serve a secondary purpose as a decorative feature that allows the energies of the material attachments to infuse the room in which they are stored with their energies. Making their energies accessible to users within the room. The float vessel 10 will be able to be stored upside down with the material attachments 20 still attached as a feature or the right way up with the top design being the feature.

The stand will be available as connecting parts that can be built on as the user's collection of material attachments 20 expands. The base stand will have a place for the float vessel 10 and some space for a number of additional material attachments 20.

Figure 9:
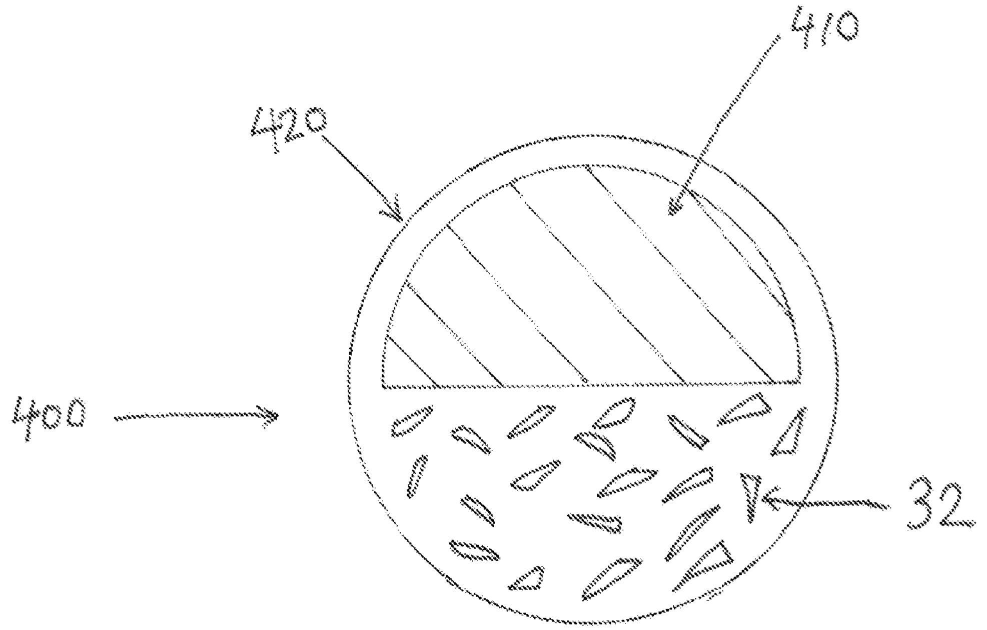
FIG. 9 shows another embodiment of the float vessel.

FIG. 9 shows another alternative embodiment being a float vessel 400 which provides a buoyant material 410 (natural or manmade) encased in a permeable external container 420 made of metal or a form of plastic with free materials 32 also enclosed in the external container 420. The free materials 32 are disposed in a chamber within the container 420 with liquid permeable walls. The external container 420 is preferably in a sphere shape but can be other shapes. This embodiment also floats and submerses the materials 32 to ensure the healing energy of the materials are amplified and circulated in the body of water but does not easily allow for the user to change the materials. The user would need to obtain a different container with different materials if they wanted to have a different healing experience. The external container can be provided with two sections, one for the buoyant material 410 and one for the materials 32, the half with the materials 32 could become interchangeable. The unity of invention then between float vessel 10, float vessel 10*b* and float vessel 400 is that they are apparatus that allow for the innovative crystal/spiritual/energy/Reiki healing method to be executed.

Figure 8:
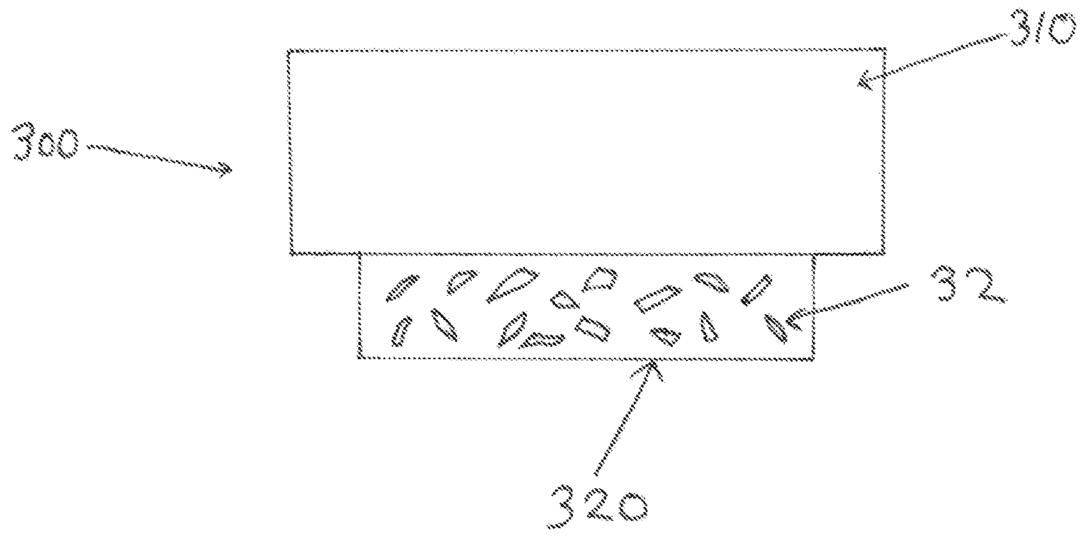
FIG. 8 shows another embodiment of the float vessel.

FIG. 8 shows another alternative being a float vessel 300 with a buoyant body 310 and a liquid permeable container made 320 of metal or plastic attached to the body 310, the container 320 containing said materials 32. The permeable container 320 could be permanently attached to the body 310, or temporarily attached (removable) allowing for interchange with other containers 320 filled with different combinations of crystal materials 32. The permeable container houses a selection of materials 32. If permanently attached, the user would need to buy more than one product should they wish to change crystal combinations. However, if temporarily attached to allow interchange, the container 320 can be removed to allow attachment of a new container 320 with a different selection of materials 32. In this instance the vessel in reusable and the containers of materials can be interchanged to allow for the use of different materials. Another possible embodiment would be a cylindrical permeable container having such materials which can be received in the central cavity 40 of the embodiment shown in FIG. 5. However, this system only allows the user to use the crystal combinations selected by the maker and does not allow for full user freedom to change individual crystal and create their own unique combinations from a broad selection like the standard model discussed above. The unity of invention then between float vessel 10, float vessel 10*b*, float vessel 400 and float vessel 300 is that they are apparatus that allow for the innovative crystal/spiritual/energy/Reiki healing method to be executed.

Figure 7:
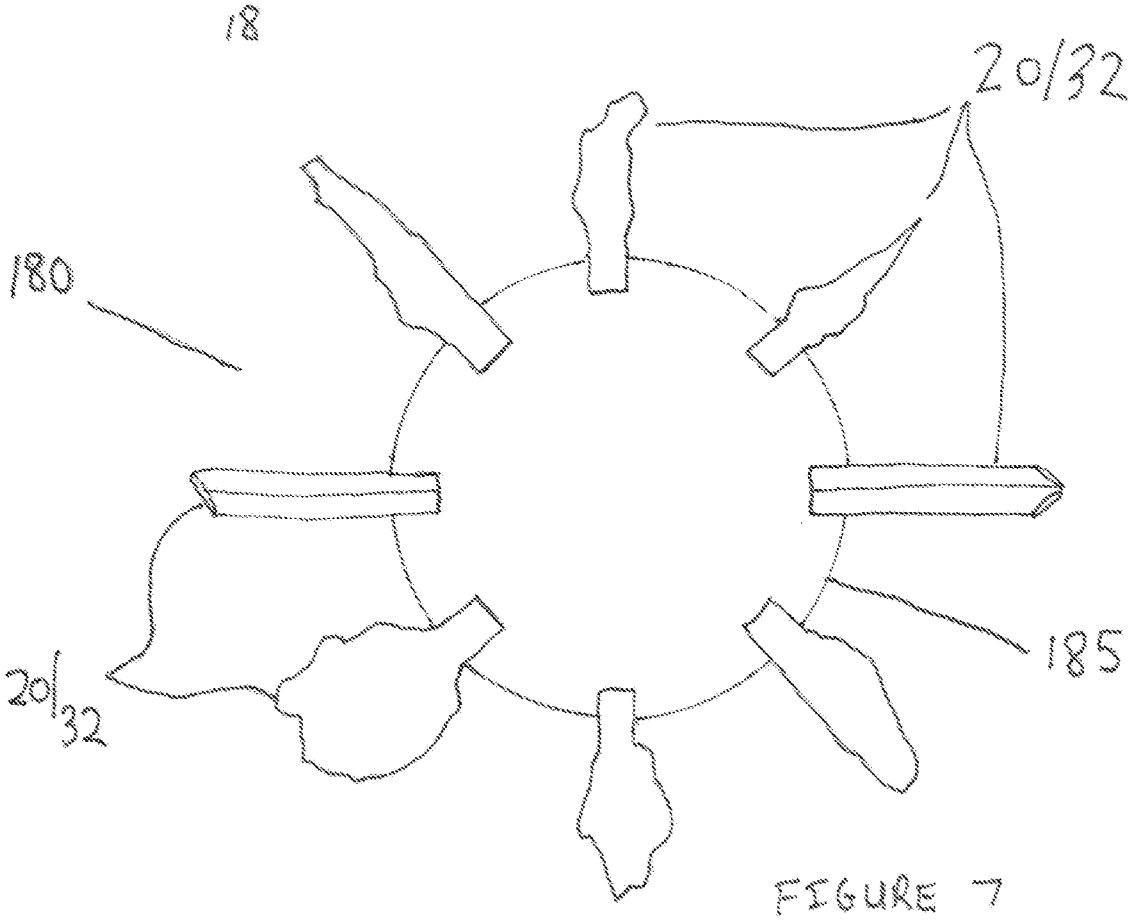
FIG. 7 shows another embodiment of the float vessel.

Another embodiment float vessel 180 as shown in FIG. 7 provides a buoyant material 185 (either natural or manmade) in the shape of a sphere which has material attachments 20 permanently or removably attached evenly or in some other spaced manner across the entire surface thereof to allow the float vessel 180 to move and rotate within the body of water, allowing different surfaces and hence the different material attachments to enter the water at different times as the sphere moves and rotates through the body of water. The sphere shaped vessel 180 can rotate or roll along the body of water at which different material attachments 30 will enter the water surface. The user for example can push or rotate the vessel in the water. The unity of invention then between float vessel 10, float vessel 10*b*, float vessel 400, float vessel 300 and float vessel 180 is that they are apparatus that allow for the innovative crystal/spiritual/energy/Reiki healing method to be executed.

This embodiment can be designated as wherein the top portion is a half sphere and the bottom portion is a half sphere such that the float vessel comprises a buoyant whole sphere shaped body. This embodiment can further comprise a movable biasing weight within the float vessel, such as a weight movable along an internal vertical chamber, such that the top portion or the bottom portion can remain submerged, where the user can select as to whether the top portion or the bottom portion will be submerged in the liquid. The user will be able to flip the sphere vessel as desired.

Connection means 18 can also be provided to the top portion to provide additional healing and a decorative effect.

The sealing of crystals and other materials in their connectors (likely with an organic and non-toxic resin) to make crystals that are naturally toxic in water safe to use as the seal would stop the toxins from entering the body of water.

Chains (or the like) could be attached to the connecting system that would then allow crystals to be attached to the chain and connected to the float. The chain for example can be similar to the anchoring mechanism 130 and provided with a connection means 18 at the end of the tie means 132.

The float vessels can be used in small and large vessels/containers and/or bodies of water and these vessels or bodies of water can be sealed or unsealed. The float vessel for example can be used in jugs or water bottles to create crystal elixirs and/or other ways to extend its use.

The float vessels can also incorporate an oil burner and/or incense burner, for example in the top surface 15. The top surface can include a recess for a tealight candle and a stand for the oil or incense holder above the candle.

The connecting system 18 and 30 for the materials 20 could be provided to key rings to allow people to take the crystals with them and to swap them each day in relation to their needs or used with a crystal grid board that allows the material attachments 20*r* to be attached using the connecting system 18 and 30.

Figure 10:
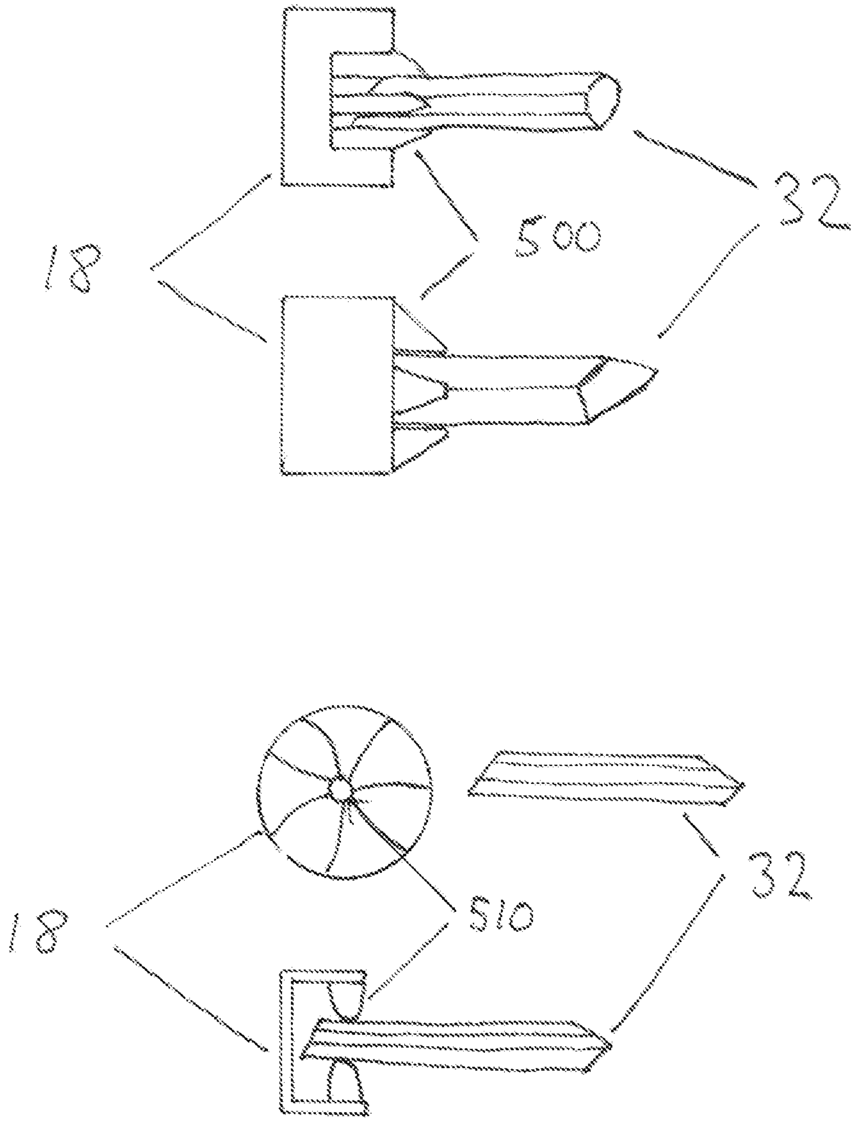
FIG. 10 shows direct connection of materials to connection means having locking means.

FIG. 10 shows connection means 18 for materials 32 which comprises locking means for locking the material 32 thereto in a removable manner without the need for a mount ring 30 for the materials 32. The locking means in the examples shown being a claw mechanism 500 and a grip mechanism 510 having teeth, claws, or high friction surfaces which are biased to engage an end portion of a material therein. Ends of the materials 32 can be shaped for insertion into such claw mechanisms 500.

This new method progresses the current Art of crystal/spiritual/energy healing in that it more authentically simulates the experience of receiving a healing from a practitioner for individuals who are using crystal healing methods for self-healing rather than receiving from a healer. Normally if using crystal/spiritual/energy/Reiki healing for self-healing one would be required to hold or place crystals upon they're body while they sit or lay in a static position with the crystals maintaining static positions where they have been placed. It also requires that in most instances that the crystals be placed upon the body or held yet when receiving a healing from a practitioner they often will hold and suspend crystals over the body and specific energy centers and at different levels of the auric field allowing for energy to be transferred to the body and energy centers and field in different, dynamic and responsive ways. With the position of crystals sometimes changing throughout the healing in response to the changes in the persons energy fields as they respond to the benefits of the healing. Further, when self-healing with crystals and other healing stones/materials the benefits of having the additional healing energy of the healing practitioner is lost, meaning that the healing energies, benefits and experience are not as strong when self-healing.

The current innovative crystal/spiritual/energy/Reiki healing method in this application addresses these limitations in two key ways. Firstly, to address the loss of additional energy that is received through having an external healer practitioner apply the crystals and lend their additional healing energies to activate and magnify the healing properties of the crystals and other healing stones/material, this method for self-healing is conducted in the bath (or body of water) which utilizes the water as the external body and energy source that activates and magnifies the healing properties of the crystals and other healing stones. Hence, reducing the need for an external healing practitioner and making self-healing more accessible, powerful and resulting in increased energy and positive healing benefits.

Secondly, to address the issue of the dynamic and responsive element of receiving a crystal/spiritual/energy/Reiki healing and required to get the most out of a healing, the new innovative method here brings this dynamic and responsive feature by creating and using an apparatus to suspend the partially or fully submerged materials on the surface of the body of water. This progresses the previous art of using crystals and other healing stones and minerals in the bath or a body of water from being static and unresponsive as they have previously been placed around the bath (hence not gaining the enhanced magnification of energy and increased benefits) or on the bottom of the bath, so, as with self-healing techniques outside the bath they are static and unresponsive. Using the purposely designed apparatus that floats on the body of water and suspends the crystals and healing stones submerged over the user's body and through the auric field of the person applying this self-healing method. The float can move on its own allowing the energies of the crystals and healing stones to be responsive to changes on the energy system or they can also be easily directed by the person using the apparatus to a selected position. It is these changes in the previous art that make this method and apparatus novel, inventive and have industrial application. While this innovative method and inventive apparatus was developed primarily to assist in this enhanced and innovative crystal/spiritual/energy/Reiki self-healing method there are a range of secondary methods and applications for use of the apparatus developed and described here.

The new method provides a new way to harness the magnified healing energies of crystal/energy/spiritual/Reiki healing when using materials in water. The innovative method provides the materials to be partially or fully submerged in the water in a dynamic way that allows them to float and move across the body of liquid.

For the innovative crystal/energy/spiritual/Reiki healing method to be actualized an apparatus that could house the materials in a way that would allow them to be partially or fully submerged and allow/encourage movement across and around the body of water was needed as none existed for this purpose. Therefore, the invention provides a float vessel to meet these requirements which provides the crystal/energy/spiritual/Reiki healing method where the apparatus suspends the crystals in the body of water.

The description describes the invention being used in a body of water, however the invention can be used in any body of liquid.

We claim:

1. A method of harnessing the magnified healing energies of crystals, gemstones or minerals when using crystal, gemstone or mineral materials in liquid, the method comprising the steps of:

providing a float vessel being comprised of a buoyant body having a top portion and a bottom portion, the bottom portion having a plurality of vessel connection means for connecting crystal, gemstone or mineral materials attachments thereto, and a candle holder being of a height such that a bottom wall thereof is disposed below a bottom surface of the buoyant body;

providing a plurality of crystal, gemstone or mineral material attachments having complementary attachment connection means to the vessel connection means; and connecting a plurality of crystal, gemstone or mineral material attachments to the float vessel via the complementary connection means, wherein the buoyant body further comprises a central cavity extending from a top surface to a lower surface thereof for receiving the candle holder, the candle holder being a hollow light transmitting candle holder, wherein in use the buoyant body floats in a body of liquid, wherein the top portion is above the liquid top surface, and wherein the bottom portion is submerged in the liquid below the liquid top surface such that the crystal, gemstone or mineral material attachments are partially or fully submerged in the liquid that allows the crystal, gemstone or mineral material attachments to float and move across the body of liquid, and wherein, in use, a candle received in the candle holder is below the surface of the liquid so at to provide an illuminating effect to the body of liquid and the crystal, gemstone or mineral material attachments.

2. The method of claim 1, wherein the crystal, gemstone or mineral material attachments are interchangeable via the complementary connection means allowing the user to change the crystal, gemstone or mineral material attachments to suit their healing requirements.

3. The float vessel of claim 1, further comprising: a reflective substance attached to the lower surface of the vessel to enhance the light reflection of the candle.

4. A float vessel, comprising:

a buoyant body having a top portion and a bottom portion, the bottom portion having a plurality of vessel connection means for connecting crystal, gemstone or mineral material attachments thereto;

a plurality of crystal, gemstone or mineral material attachments having complementary attachment connection means to the vessel connection means, the plurality of crystal, gemstone or mineral material attachments being attachable to the float vessel via the complementary connection means; and a candle holder being of a height such that a bottom wall thereof will be disposed below a bottom surface of the buoyant body, wherein in use the buoyant body can float in a body of liquid, wherein the buoyant body further comprises a central cavity extending from a top surface to a lower surface thereof for receiving the candle holder, the candle holder being a hollow light transmitting candle holder, wherein the top portion is above the liquid top surface, wherein the bottom portion is submerged in the liquid below the liquid top surface such that the crystal, gemstone or mineral material attachments are partially or fully submerged in the liquid that allows the crystal, gemstone or mineral materials to float and move across the body of liquid, and wherein, in use, a candle received in the candle holder is below the surface of the liquid so at to provide an illuminating effect to the body of liquid and the crystal, gemstone or mineral material attachments.

5. The float vessel of claim 4, wherein the bottom portion is larger, denser and/or heavier than the top portion such that the float vessel can only float with the bottom portion submerged in the liquid.

6. The float vessel of claim 4, wherein each vessel connection means comprises a threaded female socket in the bottom portion and each complementary attachment connection means comprises a corresponding male threaded mount ring of a material attachment.

7. The float vessel of claim 4, wherein each vessel connection means comprises a bayonet socket and each complementary attachment connection means comprises a bayonet mount formation.

8. The float vessel of claim 4, wherein the vessel connection means comprises locking means for the material directly thereto, and the complementary attachment connection means comprises a shaped end of the material attachment.

9. The float vessel of claim 8, wherein the locking means comprises a claw mechanism or a grip mechanism having teeth, claws, or high friction surfaces which are biased to engage a shaped end portion of a material attachment therein.

10. The float vessel of claim 4, wherein vessel connection means are provided to the side walls of the bottom portion and to the top portion.

11. The float vessel of claim 4, further comprising: an anchoring mechanism to stop or limit movement of the float vessel within the body of liquid.

12. The float vessel of claim 4, wherein the top portion is a half sphere and the bottom portion is a half sphere such that the float vessel comprises a buoyant whole sphere shaped body having a plurality of vessel connection means for connecting material attachments thereto disposed in a spaced manner along its surface, wherein in use, crystal, gemstone or mineral material attachments are attached to the vessel connection means and the buoyant body can float in a body of liquid and can rotate in the body of liquid allowing different crystal, gemstone or mineral material attachments to enter the liquid at different times.

13. The float vessel of claim 12, further comprising:

a movable biasing weight in the float vessel such that the top portion or the bottom portion can remain submerged, where the user can select as to whether the top portion or the bottom portion will be submerged in the liquid.

14. The float vessel of claim 4, wherein the crystal, gemstone or mineral materials are enclosed in a permeable container having a corresponding attachment connection means.

* * * * *